United States Patent [19]

Hoffman

[11] 4,348,585

[45] Sep. 7, 1982

[54] FREQUENCY/SPEED CONTROLLER

[75] Inventor: John P. Hoffman, Peoria, Ill.

[73] Assignee: Caterpillar Tractor Co., Peoria, Ill.

[21] Appl. No.: 83,997

[22] PCT Filed: Apr. 2, 1979

[86] PCT No.: PCT/US79/00209

§ 371 Date: Apr. 2, 1979

§ 102(e) Date: Apr. 2, 1979

[51] Int. Cl.³ .............................................. G06M 3/04
[52] U.S. Cl. ........................... 235/92 CT; 235/92 EV; 318/318
[58] Field of Search ........ 235/92 CT, 92 EV, 92 FQ, 235/92 CV, 92 MP; 318/310, 318

[56] References Cited

U.S. PATENT DOCUMENTS

| | | | |
|---|---|---|---|
| 3,110,853 | 11/1963 | Jones | 318/318 |
| 3,543,116 | 11/1970 | Haner et al. | 318/318 |
| 3,548,169 | 12/1970 | Togneri | 235/92 FQ |
| 3,724,720 | 4/1973 | Bullivant | 318/318 |
| 3,974,428 | 8/1976 | Hafle | 318/318 |
| 3,989,931 | 11/1976 | Phillips | 235/92 FQ |
| 4,130,785 | 12/1978 | Penet | 318/318 |

*Primary Examiner*—Joseph M. Thesz
*Attorney, Agent, or Firm*—Frank L. Hart

[57] ABSTRACT

A frequency/speed controller is provided for controlling the frequency or speed of a device by comparing the frequency of the device to a known reference frequency and matching the device frequency with the reference frequency. The controller uses an up/down counter whose count at any given time is the digital quantized form of $$\int_0^t (f_1 - f_2)dt$$

where $f_1$ and $f_2$ are the frequencies to be matched.

14 Claims, 5 Drawing Figures

FREQUENCY/SPEED CONTROLLER

DESCRIPTION

Technical Field

This invention relates to an apparatus for controlling the speed or frequency of a device by comparing the frequency of the device to a known reference frequency and matching the frequency of the device to the reference frequency.

Background Art

It is often desirable to control the speed or frequency of a device to obtain a desired result. In a laboratory setting for testing engine components off the engine, such as the governor, fuel pump, or injectors for example, it is desirable to control the rotational speed of a hydraulic motor which in turn controls the mechanical operation of the component. It is necessary to control the rotational speed of the hydraulic motor very accurately to insure accurate measurement of fuel flow rates and governor characteristics for example. The torque required to drive the fuel injection system at a steady speed may contain severe cyclic deviations from the average speed. It is therefore desirable to precisely control the rotational speed of the hydraulic motor in a simple, stable manner to be assured of accurate and repeatable test results.

In British Patent Specification No. 1,450,434 published Sept. 26, 1976 Takeshi Hori discloses a phase control apparatus for a rotary member. A rotary disc is connected to the rotary shaft of a motor. The disc has a bar magnet attached thereto whose position is sensed by two angularly displaced pulse generators. The outputs of the pulse generators are fed to a mixer which in turn is fed to a sampling-hold circuit and finally to the motor. When the motor is rotated at a preselected rotational speed, a square wave signal from a generator coincides in time with the signals from the two signal generators. When the motor speed varies, the circuitry adjusts the speed to coincide with the preselected speed. While the apparatus does control the motor speed, it is limited in operation by the positions of the two signal generators with respect to the bar magnet and functions only in response to a certain synchronizing signal. It is desirable to control the rotational speed of the motor by comparing the actual rotational speed with any reference speed.

Disclosure of Invention

In one aspect of the present invention, an integrating frequency-difference counter comprises an up/down counter having an up/down input, a clock input, and an output, and being free to count in response to receiving a clock signal at the clock input, free to count up in response to receiving an up count signal at the up/down input, and free to count down in response to receiving a down count signal at the up/down input; signal generating means for generating first and second clock outputs and first and second count outputs with the clock and count outputs being generated at a preselected frequency in a preselected sequential order; first means for receiving a first reference frequency signal of frequency $f_1$, combining the first frequency signal with the first clock output in a preselected manner, and producing the clock signal; second means for receiving a second controlled frequency signal of frequency $f_2$, combining the second frequency signal with the second clock output in a preselected manner, and producing the clock signal; third means for receiving the first sequencer count output and producing the up count signal; and fourth means for receiving the second count sequencer output and producing the down count signals, the output of the counter at any time being the digital quantized form of $$\int_0^t (f_1 - f_2) dt.$$

In another aspect of the invention, apparatus for controlling the frequency of a device having a frequency output signal, comprises a frequency controller having an input and being connected to the controlled device; means for generating a reference frequency signal; and an integrating frequency-difference counter having first and second inputs for receiving the reference and output signals and an output connected to the frequency controller.

In another aspect of the invention, an apparatus for controlling the speed of a device having a speed output signal, comprises a speed controller having an input and being connected to the controlled device; means for generating a reference frequency signal; means for converting the speed output signal to a frequency output signal; and an integrating frequency-difference counter having first and second inputs for receiving the reference and output signals and an output connected to the speed controller.

The present invention compares a controlled frequency with a reference frequency and increases or decreases the controlled frequency to match the reference frequency. To control speed, a speed signal is converted to a frequency signal. An integrating frequency difference counter is used to increase or decrease the controlled frequency.

BEST MODE FOR CARRYING OUT THE INVENTION

Figure 1:
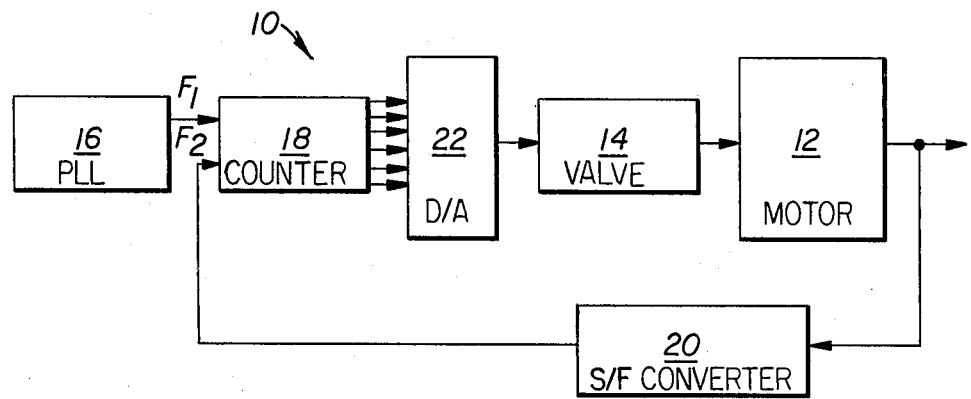
FIG. 1 is a block diagram of an embodiment of a control circuit for controlling the frequency or speed of a device.

Referring to FIG. 1 a frequency/speed controller 10 is provided for controlling the frequency or speed of a frequency or speed source, such as a hydraulic motor 12 for example. A frequency/speed control device, such as a valve 14, varies the speed or frequency of the motor 12. The frequency/speed controller 10 functions to match the motor frequency, $f_2$, with a reference frequency, $f_1$, produced by a frequency generator, such as a phase locked loop frequency generator circuit 16 so that the motor rotates at a given speed. The two frequency signals, $f_1$ and $f_2$, are received by an integrating frequency-difference counter 18 whose output controls the valve 14. Where the output of the motor 12 is a speed signal instead of a frequency signal a speed-to-frequency converter 20 is used. Also where the valve 14 requires an analog signal rather than a digital signal, a digital-to-analog converter 22 is used to interface the counter 18 and valve 14.

Figure 2:
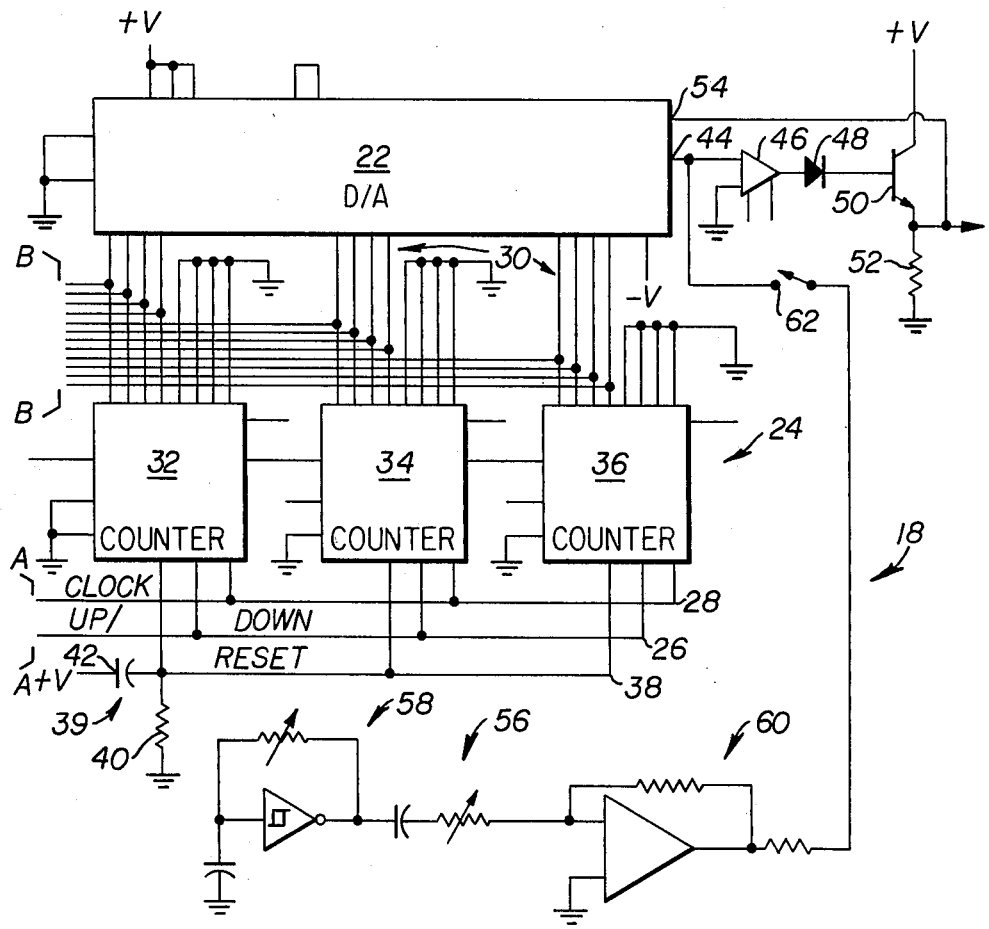
FIG. 2 is a schematic diagram of a portion of the block diagram of FIG. 1 and is connected to FIG. 3 along lines A—A, and B—B.

Referring to FIG. 2, the integrating frequency-difference counter 18 includes an up/down counter 24 having an up/down input 26, a clock input 28, and an output 30. The counter 24 is free to count in response to receiving a clock signal at the clock input 28, free to count up in response to receiving an up count signal at the up/down input 26, and free to count down in response to receiving a down count signal at the up/down input 26. The signal on the up/down input 26 does not cause the counter 18 to count but it does tell the counter 18 whether to count up or down when the clock signal is received at the clock input 28. The counter 24 includes three 4-bit counters, 32,34,36 having their inputs connected in parallel.

The counter 24 includes a power-on reset input 38 which receives a signal from a power-on reset circuit 39. The circuit 39 connects input 38 to ground through a resistor 40 and through a capacitor 42 to positive battery.

The output 30 of the counter 24 is received by the D/A converter 22 whose output 44 is connected to the inverting input of an operational amplifier 46. The non-inverting input of the amplifier 46 is grounded and its output is coupled by a diode 48 to the base of an output transistor 50. The collector of the transistor 50 is connected to positive battery, the emitter is coupled to ground through a resistor 52, and the output is taken at the emitter-resistor junction. The output is connected to the valve 14. A second output 54 from the converter 22 is connected to the emitter-resistor junction and to the valve 14.

A switchable square-wave dither circuit 56 is also shown in FIG. 2 for dithering or oscillating the valve 14 for fast, easy operation. The dither circuit 56 includes an oscillator 58, an amplifier 60 and a switch 62 connected between the amplifier 60 and the inverting input of the operational amplifier 46.

The operational amplifier 46 and associated circuitry is internally connected in some D/A converters in which case the dither circuit 56 must be connected elsewhere. The configuration of FIG. 2 is preferred because it easily accommodates the dither circuit 56.

Figure 3:
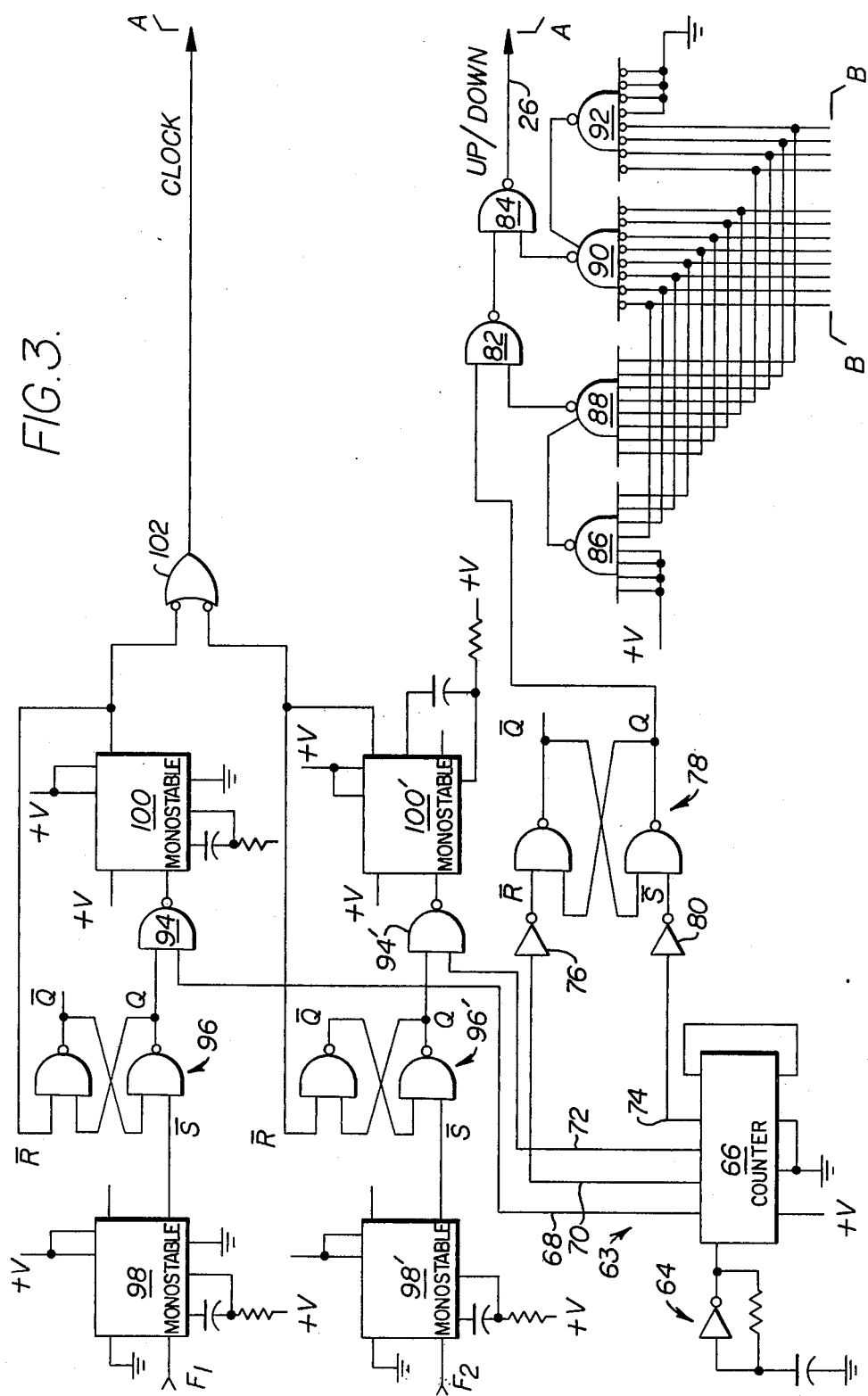
FIG. 3 is a schematic diagram of another portion of the block diagram of FIG. 1 which when joined along line A—A with FIG. 2 and forms a complete schematic diagram of control circuit of FIG. 1 and is connected to FIG. 2 along lines A—A and B—B.

Referring to FIG. 3, a signal generating means such as a sequencer 63 composed of an oscillator 64 and a counter 66, generates first, second, third and fourth outputs 68,70,72 and 74. The outputs 68,70,72,74 are generated at a preselected frequency in a preselected sequential order, namely 68,70,72, and 74. The signal generating means 64,66 sequentially operates at a rate at least four times greater than the frequencies of either the first or second frequency signals $f_1$, $f_2$.

The second output 70 is connected through an inverter 76 to the $\overline{R}$ input of a flip-flop 78 and the fourth output 74 is connected through an inverter 80 to the S input of the flip-flop 78.

The Q output of flip-flop 78 is connected to one input of NAND gate 82 whose output is connected to one input of NAND gate 84 whose output in turn is connected to the up/down input 26 of the up/down counter 24. NAND gates 86 and 88, which make up a 16 input NAND gate, have their output connected to the other input of NAND gate 82 while NAND gates 90 and 92, which make up a 16 input NAND gate, have their outputs connected to the other input of NAND gate 84. The inputs of NAND gates 86,88,90 and 92 are connected to the outputs 30 of the up/down counter 24. NAND gates 82,84,86,88,90 and 92 form a protective circuit which keeps the counter 24 from counting through zero in either the up direction or the down direction.

A NAND gate 94 has its output coupled to the clock input 28 of the up/down counter, its first input coupled to the first sequencer output 68, and its second input coupled to the reference frequency signal $f_1$. A flip-flop 96 receives the reference frequency at its $\overline{S}$ input from monostable 98 and delivers its Q output to the other input on NAND gate 94. A monostable 100 has its output connected to the $\overline{R}$ input of flip-flop 96 and one input of OR gate 102, the output of which is connected to the clock input 28 of the counter 24. The output of NAND gate 94 is connected to the input of monostable 100.

The monostables 98,100 flip-flop 96 and gates 94,102 receive the first reference frequency signal $f_1$, combines the signal $f_1$ with the first sequencer output 68 and produces a clock signal. Similarly, monostables 98',100', flip-flop 96' and gates 94',102 receive the second frequency signal $f_2$, combines the signal $f_2$ with the third sequencer 72 output and produces the clock signal.

Figure 4:
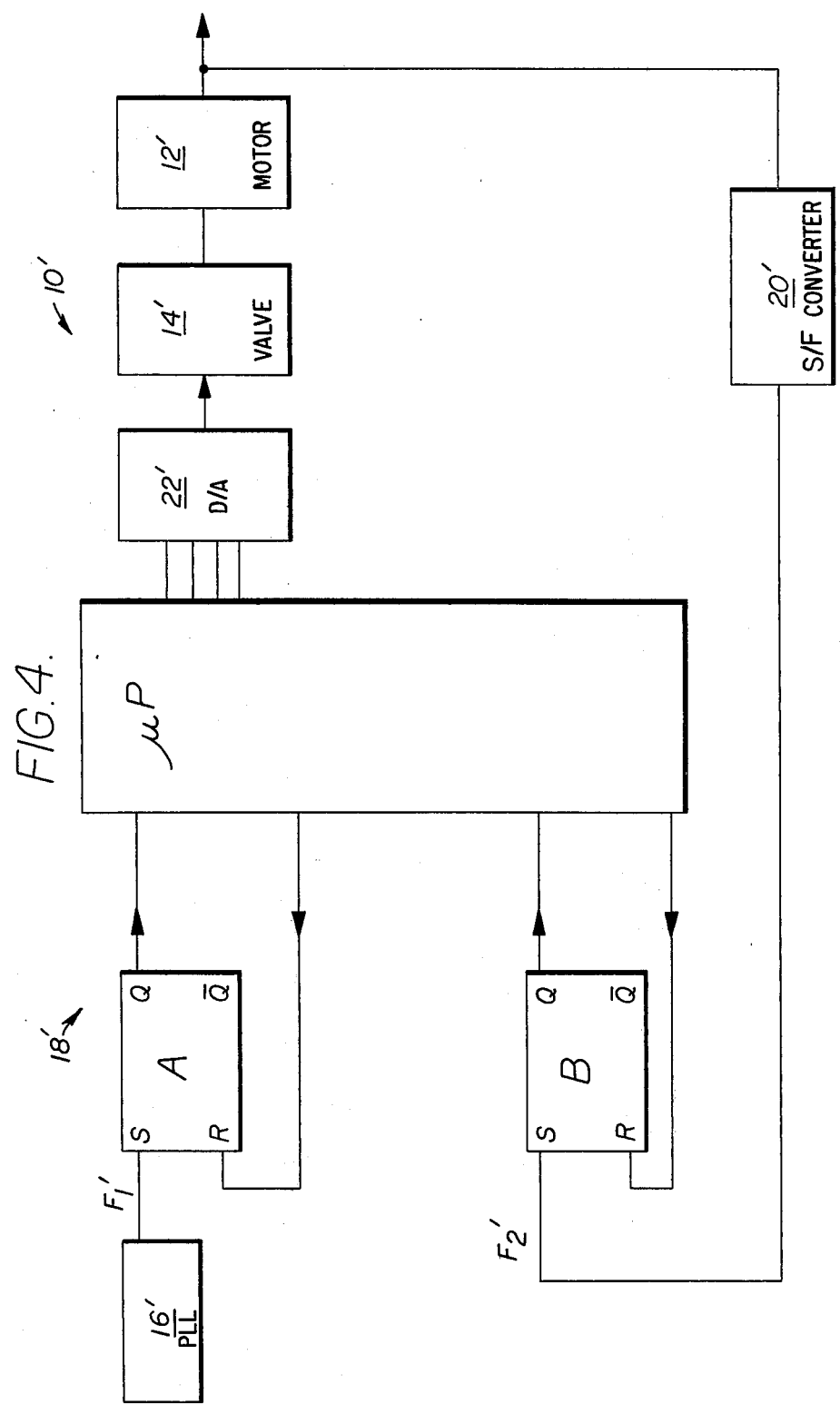
FIG. 4 is a block diagram of a control circuit similar to FIG. 1 but illustrating another embodiment.

Referring to FIG. 4, another embodiment of a frequency/speed controller 10' contains a microprocessor and RS flip-flops A and B (FFA,FFB) to form an integrating frequency difference counter 18'. The Q outputs of flip-flops A and B are input to the microprocessor and the R inputs of flip-flops A and B receive signals from the microprocessor. The S input of flip-flop A receives a reference frequency signal $f_1'$ from a reference frequency source 16', such as a square wave generator for example. The S input of flip-flop B receives a frequency signal from the controlled source 12' or from converter 20' where the controlled source 12' produces a speed signal. The output from the microprocessor is connected to the control device 14' or to a digital-to-analog converter 22' where the control device requires an analog input.

Industrial Applicability

The frequency/speed controller 10 basically makes the two frequencies, $f_1$ and $f_2$, equal. The controllable frequency $f_2$ is made equal to the reference frequency $f_1$. Where the reference frequency $f_1$ is precisely known, as from the phase-locked loop 16, then the controlled frequency $f_2$ will be precisely known. Where the motor 12 has a speed output rather than a frequency output, a speed-to-frequency converter 20 will be needed. In the common case where the speed is rotational, an absolute conversion can be made with a toothed wheel rotating at system speed and the output frequency being taken from a stationary magnetic pickup unit.

The frequency signals $f_1$ and $f_2$ are received by monostables 98,98', respectively. Ideally, the frequency signals $f_1$ and $f_2$ have square wave forms the leading edges of which activate monostables 98,98', respectively, to produce a narrow pulse output for each cycle of input. These narrow pulses are used to set RS flip-flops 96,96' which store a bit of information about the occurrence of an input cycle. The outputs of the flip-flops 96,96' are one of the inputs to NAND gates 94,94'.

The other inputs to NAND gates 94,94' are the first and third outputs 68,72 from the sequencer 63.

When the sequencer 63 produces the appropriate output 68,72, the Q outputs of flip-flops 96,96' are NANDed with the outputs 68,72 to activate the appropriate monostable 100 or 100'. The outputs of the monostables 100,100' are transmitted through OR gate 102 to the clock input 28 of the up/down counter 24. NANDing clock output 68 and $f_1$ generates a clock pulse and NANDing clock output 72 and $f_2$ generates a clock pulse. Since the sequencer 63 must transfer data for each signal $f_1,f_2$ as well as control the up/down line 26 to counter 24, sequencer 63 must operate at a sufficiently high rate. Since sequencer 63 has four stable states to perform these functions in sequence, the oscillator 64 must have a frequency at least four times higher than the highest input frequency $f_1$ or $f_2$.

The output of monostables 100,100' resets flip-flops 96,96' to ready the circuit for another input cycle. Data is transferred to the counter 24 at the same time that the flip-flops 96,96' are reset.

The fourth output 74 from sequencer 63 sets flip-flop 78, the Q output of which places the up/down counter in the up-count mode. The next output of sequencer 63 is the first output 68 which looks to see if a cycle of the reference frequency $f_1$ has been completed since the last time the fourth output 74 was produced. If a cycle has been completed a clock pulse goes to the up/down counter 24 causing it to count up by one. The second output 70 from sequencer 63 resets flip-flop 78 placing the up/down counter 24 in the down-count mode. The next output of sequencer 63 is the third output 72 which looks to see if a cycle of the controlled frequency $f_2$ has been completed since the last time second output 70 was produced. If a cycle has been completed a clock pulse goes to counter 24 causing it to count down by one. If $f_1$ and $f_2$ are exactly the same, the up/down counter 24 will receive the same number of up and down counts and will alternate between consecutive counts.

If the controlled frequency $f_2$ is higher than the reference frequency $f_1$, there will be more down counts per unit time than up counts. Thus, the counter 24 will gradually count down according to the relationship: count=quantized digital word form of $$\int_0^t (f_1 - f_2)dt$$

The lower count results in a lower output voltage from the converter 22, a lower control voltage to the valve 14, and the motor frequency will approach the reference frequency. If the motor frequency $f_2$ is lower than the reference frequency $f_1$, the up/down counter 24 will gradually count up and the motor frequency will increase and approach the reference frequency.

Protection is needed to prevent the counter 24 from counting through zero in either the up-count mode or down-count mode. This protection is needed because in a normal binary or BCD counter, such as counter 24, the next step down from zero is the maximum count and the next step up from the maximum count is zero. If the motor 12 were not capable of achieving a frequency as high as the reference frequency, the counter 24 would continually count up in an effort to raise the motor frequency. The up counting would continue until the protective circuitry, NAND gates 82,84,86,88,90 and 92, were activated thus preventing a count through zero. When the maximum count is recognized, the counter 24 is unconditionally placed in the down-count mode. When the zero count is recognized, the counter 24 is unconditionally placed in the upcount mode.

The power-on reset circuit 39 prevents the motor frequency or speed from starting at any value other than zero. This circuit is activated when the power is turned on and resets counter 24 to zero.

The number of bits to be used for the counter 24 and the digital-to-analog converter 22 will depend upon the particular application. Under ideal conditions, in the steady state, the counter 24 will alternate between two adjacent counts. This may cause some slight deviation of the speed or frequency of the motor 12. However, if enough bits are used, the resolution will be great enough that one count of change will be well within any specified tolerance. An alternate approach is to purposely limit the number of bits to get a self-dither effect. Where needed, a dither signal is provided by the dither circuit 56.

Where the valve 14 requires an analog input, that input is taken at the emitter of the transistor 50 which is controlled by the output 44 of the converter 22. Where a digital input to valve 14 is required, converter 22 is unnecessary because the digital outputs from the counters 32,34,36 are connected to the valve 14.

As described above, the apparatus 10 is useful as a speed control unit for testing wherein a hydraulic motor 12 controls the fuel injection system for a diesel engine. The motor speed simulates an engine condition and must be precisely controlled. The apparatus 10 precisely controls the motor speed and facilitates testing of the fuel system components.

The speed of the motor 12 is effectively controlled whether the motor 12 is electrical, hydraulic or pneumatic. Hydraulic and pneumatic motors require the use of the valve 14 but an electric motor can be driven from the output of the integrating frequency difference counter 18 or the D/A converter 22 by adding a power amplifying stage. Where the motor 12 is an alternator, for example, the apparatus 10 controls the output frequency.

The apparatus 10 can be used as a cruise control system for an automobile in which case the reference frequency $f_1$ would be varied by the driver of the automobile. The controlled frequency $f_2$ could be produced by one of the four tires, a rotating shaft or other member indicative of vehicle speed. The output of the integrating frequency counter 18 would operate a valve 14 to increase or decrease the flow of fuel and thus regulate speed. The apparatus 10 can also be used to synchronize the speeds of wheels on wheeled vehicles or the speeds of the tracks on track-type vehicles.

Figure 5:
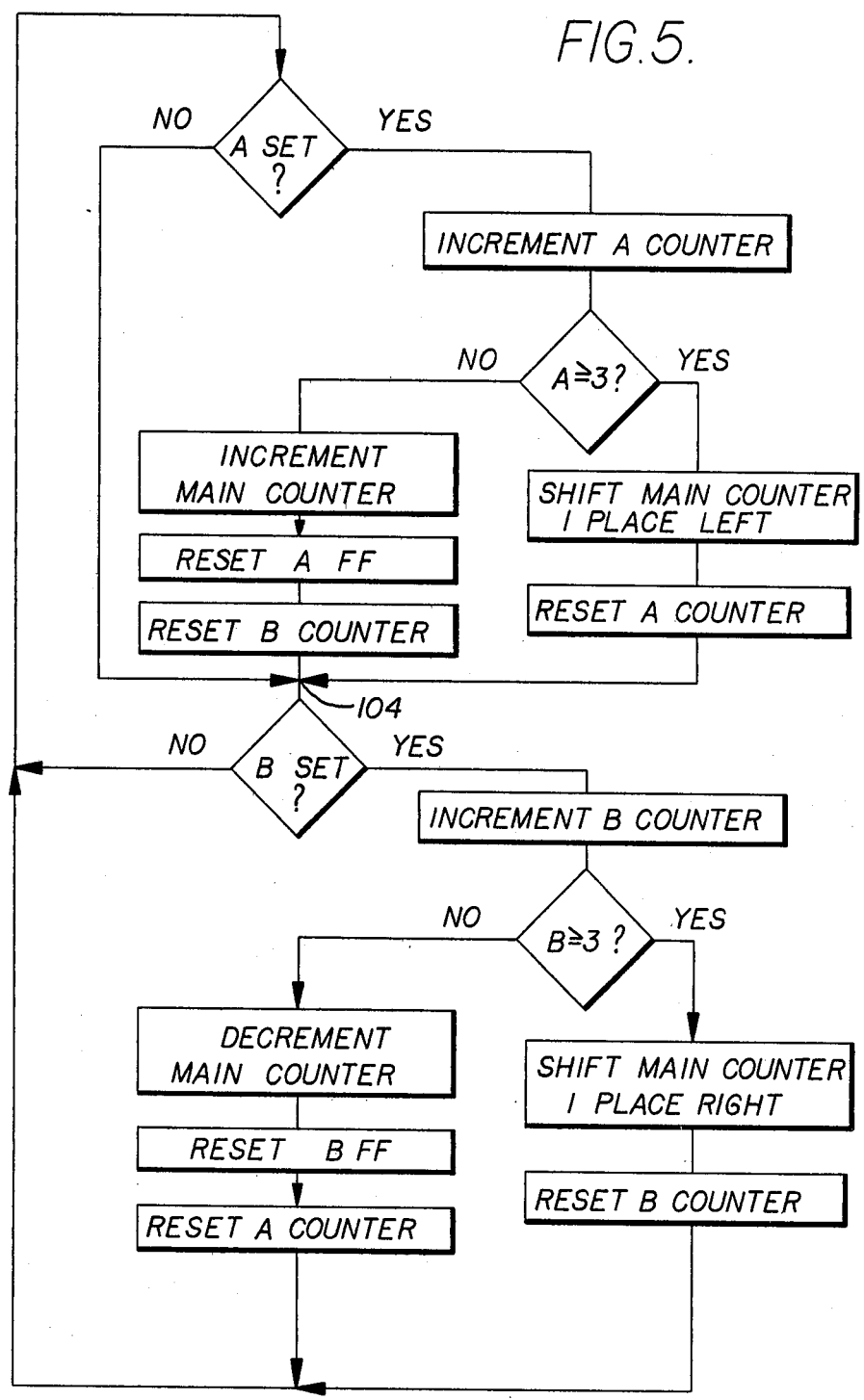
FIG. 5 is a diagrammatic flowchart illustrating the operation of the control circuit of FIG. 4.

Referring to FIGS. 4 and 5, reference signal $f_1'$ is received by flip-flop A and signal $f_2'$ is received by flip-flop B. The microprocessor scans FFA and FFB. If FFA is not set and FFB is not set, the scanning continually repeats. When $f_1'$ sets FFA a consecutive A counter is incremented. If the count of counter A is less than three, the main counter is incremented, FFA is reset and counter B is reset which advances the sequence to point 104 on the flowchart. If the count of counter A is three, the main counter is shifted one place to the left and counter A is reset which advance the sequence to point 104 on the flowchart.

If flip-flop B is not set, the cycle starts again. If FFB is set, counter B is incremented. If the count of counter B is less than three, the main counter is decremented, FFB is reset and counter A is reset and the complete sequence begins again. If the count of counter B is three, the main counter is shifted one place to the right and counter B is reset and the complete sequence begins again.

If the controlled device 12' is operating at the correct speed or frequency, the main counter gets as many increments as decrements and there is no significant change in speed or frequency. If the actual device 12' speed or frequency is too high or too low, the main counter will count down or up, respectively, to send a corrected signal to the controller 14'. If there should be three consecutive counts into either FFA or FFB and three consecutive counts into counters A or B, then the speed is in error by a ratio of at least two to one. When this occurs, the main counter count is either doubled or halved by shifting.

Other aspects, objects and advantages of this invention can be obtained from a study of the drawings, the disclosure and the appended claim.

I claim:

1. An integrating frequency-difference counter (18) comprising:

an up/down counter (24) having an up/down input (26), a clock input (28) and an output (30), said counter (24) being free to count in response to receiving a clock signal at the clock input (28), free to count up in response to receiving an up count signal at the up/down input (26), and free to count down in response to receiving a down count signal at the up/down input (26);

signal generating means (64,66) for generating first, second, third and fourth outputs (68,70,72, 74), said outputs (68,70,72,74) being generated at a preselected frequency in a preselected sequential order;

first means (94,96,98,100) for receiving a first reference frequency signal of frequency $f_1$, combining the first frequency signal with the first output (68) in a preselected manner, and producing the clock signal;

second means (94',96',98',100') for receiving a second controlled frequency signal of frequency $f_2$, combining the second frequency signal with the third output (72) in a preselected manner, and producing the clock signal;

third means (76,78) for receiving the second output (70) and producing the down count signal; and fourth means (78,80) for receiving the fourth output (74) and producing the up count signal, the output (30) of the counter (24) at any time being the digital guantized form of $$\int_0^t (f_1 - f_2)dt.$$

2. A counter (18), as set forth in claim 1, wherein the signal generating means (64,66) sequentially generates the first output (68), the third output (72), the second output (70), and the fourth output (74).

3. A counter (18), as set forth in claim 1, wherein the signal generating means (64,66) sequentially operates at a rate at least four times as fast as the first and second frequency signals.

4. A counter (18), as set forth in claim 1 wherein the first means (94,96,98,100) includes a NAND gate (94) having an output coupled to the clock input (28) of the up/down counter (24), a first input coupled to the first output (68) of the signal generating means (64,66), and a second input; and a flip-flop (96) having an input for receiving the first reference frequency signal and an output connected to the second input of the NAND gate (94).

5. A counter (18), as set forth in claim 4, including a monostable (100) having an output connected to the input of the flip-flop (96) and an input for receiving the first reference frequency signal.

6. A counter (18), as set forth in claim 4, including a monostable (100) having an input connected to the output of the NAND gate (94) and an output coupled to the clock input (28) of the up/down counter (24).

7. A counter (18), as set forth in claim 6, wherein the flip-flop (96) has a reset input and wherein the output of the monostable (100) is connected to the reset input.

8. A counter (18), as set forth in claim 1, including an OR gate (102) having an output connected to the clock input (28) of the up/down counter (24), a first input connected to the first means (94,96,98, 100) and a second input connected to the second means (94',96',98',100').

9. A counter (18), as set forth in claim 1, wherein the third means (78,80) includes a flip-flop (78) having an output coupled to the up/down input (26) of the up/down counter (24), a set input coupled to the fourth output (74) of the signal generating means (64,66), and a reset input coupled to the second output (70) of the signal generating means (64,66).

10. A counter (18), as set forth in claim 1, including means (82,84,86,88,90,92) for preventing the up/down counter (24) from counting up or down through zero.

11. An apparatus for controlling the speed of a device, comprising:

means for supplying a first frequency proportional to a reference speed signal;

means for supplying a second frequency proportional to an actual speed signal;

an integrating frequency difference counter having first and second frequency inputs adapted to receive said first and second frequencies and a digital count output; and means for instantaneously doubling said digital count output in response to said first frequency input receiving at least three consecutive frequency pulses during a period in which said second frequency input is free from receiving any frequency pulses, and for instantaneously halving said digital count output in response to said second frequency input receiving at least three consecutive frequency pulses during a period in which said first frequency input is free from receiving any frequency pulses.

12. An apparatus, as set forth in claim 11, wherein said means for instantaneously doubling and for instantaneously halving includes a microprocessor.

13. An apparatus, as set forth in claim 11, wherein said doubling said digital count output includes left shifting said digital count.

14. An apparatus, as set forth in claim 11, wherein said halving said digital count output includes right shifting said digital count.

* * * * *